United States Patent
Emmett

(10) Patent No.: US 10,947,707 B2
(45) Date of Patent: Mar. 16, 2021

(54) DEVICE FOR RESISTING ROTATION OF A TAP

(71) Applicant: TAPLOK LIMITED, Lancaster (GB)

(72) Inventor: Robert Emmett, Lancaster (GB)

(73) Assignee: TAPLOK LIMITED, Lancaster (GB)

( * ) Notice: Subject to any disclaimer, the term of this patent is extended or adjusted under 35 U.S.C. 154(b) by 0 days.

(21) Appl. No.: 16/070,241

(22) PCT Filed: Jan. 13, 2017

(86) PCT No.: PCT/GB2017/050087
§ 371 (c)(1),
(2) Date: Jul. 13, 2018

(87) PCT Pub. No.: WO2017/122026
PCT Pub. Date: Jul. 20, 2017

(65) Prior Publication Data
US 2019/0024353 A1   Jan. 24, 2019

(30) Foreign Application Priority Data

Jan. 13, 2016 (GB) ..................... 1600628
Mar. 24, 2016 (GB) ..................... 1605095
Nov. 18, 2016 (GB) ..................... 1619554

(51) Int. Cl.
*E03C 1/04* (2006.01)
*F16B 21/20* (2006.01)
*F16B 35/00* (2006.01)

(52) U.S. Cl.
CPC ............ *E03C 1/0401* (2013.01); *F16B 21/20* (2013.01); *F16B 35/005* (2013.01)

(58) Field of Classification Search
CPC .... E03C 1/0401; E03C 1/04; E03C 2001/028; E03C 1/02; E03C 1/0403; F16B 21/20; F16B 35/005
USPC ............................................. 4/695
See application file for complete search history.

(56) References Cited

U.S. PATENT DOCUMENTS

| 431,791 A |   | 7/1890 | Aldrich |
|---|---|---|---|
| 556,755 A |   | 3/1896 | Kelly |
| 1,505,279 A | * | 8/1924 | Mueller ............... E03C 1/0401 285/193 |

(Continued)

FOREIGN PATENT DOCUMENTS

| CN | 202580193 U | 12/2012 |
|---|---|---|
| CN | 202964204 U | 6/2013 |

(Continued)

OTHER PUBLICATIONS

International Search Report for PCT/GB2017/050087 dated Jul. 7, 2017; 5 pages.

*Primary Examiner* — J C Jacyna
(74) *Attorney, Agent, or Firm* — Schwabe Williamson & Wyatt, PC

(57) ABSTRACT

A device 307 for resisting rotation of a tap that has been fitted to a sink, the device comprising an engagement formation 313 for engaging with a part of the tap, a body 312, and at least one distal edge 308 for contacting with a remote part of the sink. The engagement formation 313 comprises an attachment means for securing the device 307 to a part of the tap, the attachment means comprising one or more channels 334.

13 Claims, 15 Drawing Sheets

(56) References Cited

U.S. PATENT DOCUMENTS

| | | | | |
|---|---|---|---|---|
| 1,676,800 A * | 7/1928 | Richards | ............ | E03C 1/0401 4/676 |
| 1,960,278 A * | 5/1934 | Niedecken | ................ | E03C 1/04 4/677 |
| 4,467,988 A | 8/1984 | Kraus | | |
| 4,538,947 A * | 9/1985 | Burkholder | ............ | F16B 35/005 408/211 |
| 4,856,122 A * | 8/1989 | Pilolla | .................. | E03C 1/0401 4/695 |
| 5,060,892 A | 10/1991 | Dougherty | | |
| 5,865,477 A | 2/1999 | Ko | | |
| 6,006,784 A | 12/1999 | Tsutsui | | |
| 6,061,880 A | 5/2000 | Senninger | | |
| 6,209,153 B1 * | 4/2001 | Segien, Jr. | ............ | E03C 1/0401 137/359 |
| 6,301,728 B1 * | 10/2001 | Pilatowicz | ............ | E03C 1/0401 137/360 |
| 2007/0044232 A1 * | 3/2007 | McNerney | ............ | E03C 1/0401 4/695 |
| 2008/0265571 A1 | 10/2008 | Gallardo | | |
| 2009/0314903 A1 | 12/2009 | Zahuranec | | |
| 2011/0232777 A1 * | 9/2011 | Quintana | .............. | E03C 1/0401 137/15.21 |
| 2013/0291959 A1 | 11/2013 | Chen | | |
| 2014/0124049 A1 | 5/2014 | Ye | | |
| 2014/0230144 A1 | 8/2014 | Bors | | |
| 2014/0263867 A1 | 9/2014 | Brown | | |
| 2016/0024762 A1 * | 1/2016 | Hsu | ...................... | E03C 1/0401 4/619 |

FOREIGN PATENT DOCUMENTS

| | | |
|---|---|---|
| CN | 204690849 U | 10/2015 |
| GB | 893448 A | 4/1962 |
| GB | 2024377 A | 1/1980 |
| JP | H09268613 A | 10/1997 |
| JP | H10168960 A | 6/1998 |
| JP | H11311354 A | 11/1999 |
| JP | 2015014170 A | 1/2015 |
| WO | 2014/120939 A1 | 8/2014 |

\* cited by examiner

DEVICE FOR RESISTING ROTATION OF A TAP

CROSS-REFERENCE TO RELATED APPLICATION

The present application is a national phase entry under 35 U.S.C. § 371 of International Application No. PCT/GB2017/050087, filed Jan. 13, 2017, entitled "A DEVICE FOR RESISTING ROTATION OF A TAP," which designates the United States of America, and claims priority to the following three GB applications: 1600628.0, filed Jan. 13, 2016; 1605095.7, filed Mar. 24, 2016; and 1619554.7, filed Nov. 18, 2016. The entire disclosures of each are hereby incorporated by reference in their entireties and for all purposes.

TECHNICAL FIELD OF THE INVENTION

The present invention relates to a device for resisting rotation of a tap (or faucet) or multiple taps (or faucets).

BACKGROUND TO THE INVENTION

FIG. 1 shows cross-section of a known arrangement comprising a sink 1 with a tap (or faucet) 3. The tap 3 can actuate a valve to control the release of water from the tap 3. The tap 3 is a mixer tap that can supply water at a desired temperature by mixing hot water and cold water. In order to open the valve to start the flow of water, the user lifts a handle 4 of the tap 3. In order to then select a desired water temperature, the user turns the handle 4 in either a clockwise direction or a counter-clockwise direction, depending on the desired temperature, which controls the relative flow of hot water and cold water through the tap 3. To then close the valve to stop the flow of water, the user lowers the handle 4 of the opened tap 3 and turns the handle 4 back to a central position.

The tap 3 comprises a substantially cylindrical body. The body of the tap 3 comprises an abutment portion 2 and a pipe 106 with a screw thread. The radius of the abutment portion 2 is greater than the radius of the pipe 106.

In order to fit the tap 3 to the sink 1, the tap 3 is first inserted into a pre-machined cylindrical hole through the sink 1 so that the abutment portion 2 abuts with a top surface of the sink 1 and the pipe 106 protrudes downwardly from a bottom surface of the sink 1. A nut 5 is threaded onto the screw thread of the pipe 106 to secure the tap 3 to the sink 1. The nut 5 is tightened until it is in contact with the lower surface of the sink 1. The compressive force between the abutment portion 2 and the nut 5, combined with the friction between the nut 5 and the rough lower surface of the sink 1, holds the tap 3 in its place. Thus, the tap 3 is secured to the sink 1 both rotationally and axially.

However, over time, or due to vandalism, the repeated counter-clockwise and clockwise turning of the handle 4 may cause the tap 3 to become rotationally unsecured so that the tap 3 can freely rotate whilst fitted in its hole in the sink 1. This problem may be caused by, for example, the nut 5 loosening on the screw thread of the pipe 106 thereby reducing the compressive force between the nut 5 and the abutment portion 2, or by the nut 5 wearing away the lower surface of the sink 1 so that it becomes smooth, thereby lowering the frictional force between the nut 5 and the lower surface of the sink 1

FIG. 12 shows a cross-section view of a similar known arrangement that suffers from the same problem. In this arrangement, the sink comprises a first tap (or faucet) 3 and a second tap (or faucet) 600.

Embodiments of the present invention seek to address the above problem.

SUMMARY OF THE INVENTION

According to a first aspect of the present invention, there is provided a device for resisting rotation of a tap that has been fitted to a sink, the device comprising: an engagement formation for engaging with a part of the tap; and a body, wherein the device comprises at least one distal edge for contacting with a remote part of the sink.

In this way, the present invention provides for a device that can be used to block rotation of a tap relative to a sink. After the device has been applied to a tap and a sink, if the tap becomes loose from the sink during use, rotational movement of the loose tap will attempt to rotate the device relative to sink since the device is attached to the loose tap. However, it is not possible to rotate the device because the distal edge of the device is abutting a part of the sink remote from the tap. The device is thus physically blocked from rotating by its contact with the sink. If the device cannot rotate, the tap cannot rotate because it is connected to the device by the engagement formation. Accordingly, the above problem of a tap freely rotating is mitigated.

The at least one distal edge may be arranged to abut a downwardly depending (in normal use) part of the sink.

The body may be elongate. The body may be cuboid in shape. Thus, the body may have a substantially rectangular profile. The body may alternatively be I-shaped, substantially I-shaped, T-shaped, substantially T-shaped, M-shaped or substantially M-shaped. The body may comprise rounded or chamfered corners. The body may be formed from a rigid material. The body may be formed from metal or a polymer. The metal may be aluminium. The body may comprise one or more channels or apertures. The body may be shaped to fit around a hot water pipe and/or a cold water pipe.

The body may be formed from two or more body portions. In particular, the body may be formed from two body portions. The body portions may be substantially similar. The body portions may be securable together by one or more connectors such as screws, a set of nuts and bolts, or the like.

The device may comprise a plurality of distal edges for contacting with the sink. In particular, the device may comprise two distal edges, a first distal edge and a second distal edge, each distal edge being arranged to abut and interact with a part of the sink. The two distal edges may be provided oppositely about the engagement formation. The two distal edges may be aligned with one another. Each distal edge may be remote from the engagement formation. Each distal edge may be arranged to abut with a part of the sink that is remote from the tap and/or the engagement formation and is optionally a downwardly depending part of the sink. Each distal edge may comprise a flat surface and/or a curved surface. The flat surface or the curved surface may correspond to the shape of a part of a sink, in particular that corresponds to the shape of a part of the underside of a sink. Each distal edge may comprise rounded corners for assisting in contacting with a part of the sink. Each distal edge may be provided on the body.

The device may comprise one or more locking elements. The device may comprise a plurality of locking elements. The device may comprise two locking elements. Each distal edge may be provided on a locking element. The length of a locking element may be adjustable so as to allow for the distance between a distal edge and the engagement formation to be adjustable, and so that the distance between a distal edge and a part of the sink is adjustable when the device is mounted to a tap. Each locking element may be a bolt, a screw or the like. Each locking element may comprise a hexagonal head. Each locking element may be inserted or housed in the body. In this way, the locking elements provide the present invention with a means for adjusting the distance between the engagement formation and the distal edge(s), which means that the distance between the distance between the distal edge(s) and the tap to which the engagement formation engages is adjustable. This allows the present invention to be mounted to a variety of different sinks with different configurations.

The engagement formation may be arranged to fix to or engage with the underside of the tap. In particular, the engagement formation may be arranged to engage with a pipe of the tap or a rod of the tap.

The engagement formation may be integrally formed in the device.

The engagement formation may be substantially toroidal. Thus, the engagement formation may have a substantially circular profile.

The engagement formation may comprise an aperture. The aperture may be substantially circular. The aperture may be provided towards the centre of the body. In this way, the engagement formation may be provided with an aperture for placing over a pipe connected to a tap to engage the engagement formation with the tap.

The engagement formation may comprise an attachment means. The attachment means may comprise one or more channels. The attachment means may comprise a plurality of channels. Each channel may be integrally formed in the body. Each channel may be substantially cylindrical in shape. Each channel may comprise a screw thread on the inside surface of its circumferential wall. One or more channels may be oriented in the same longitudinal axis as the body. One more channels may be oriented perpendicular to the longitudinal axis of the body. One or more channels may be oriented at an angle to the longitudinal axis of the body. In particular, one or more channels may be oriented at 45° with respect to the longitudinal axis of the body. The attachment means may comprise one or more screws. Each screw may sit within a channel Each screw may comprise a screw thread on the outside circumferential surface of its body. Each screw may sit within a screw housing insert that can be inserted into a channel. Each screw housing insert may comprise a cylindrical tube. Each screw housing insert may comprise a screw thread on the inside surface of its circumferential wall. Each cylindrical tube may have ridges provided on its external surface for engagement with a corresponding surface of a channel Each screw may be a grub screw (or set screw). Each screw or grub screw may comprise an engagement surface formed at its front end for biting into a part of a tap. The engagement surface may be pointed or V-shaped or a "dog-point" (i.e. cylindrical). The engagement surface may be rounded. The engagement surface may be a rounded point. The engagement surface may be a cone point. The engagement surface may be U-shaped. Thus, each screw or grub screw may be arranged to contact with and create a depression on a pipe of the sink in order to fix the orientation of the connected tap relative to the sink. In this way, an attachment means may be provided for securely attaching an engagement formation, and therefore the device, to a tap.

The body may comprise a slot. The slot may be located distal to the engagement formation. The slot may be cut into an edge of the body, such as a perimetrical edge. The slot may be straight. The slot may have a cross section shaped for retaining a protrusion in the slot. The slot may have a substantially C-shaped cross section.

The device may further comprise one or more spacers. Each spacer may be arranged to dispose a distal edge away from the engagement formation so that the distal edge is remote from the engagement formation and thus remote from a tap engaged with the engagement formation. The device may comprise a plurality of spacers. In particular, the device may comprise two spacers. The number of spacers may be equal to the number of distal edges. Each spacer may be a block of a material such as a polymer. Each spacer may be cuboidal. Each spacer may comprise a protrusion that projects from a face. The protrusion may extend along the whole length of the spacer. The protrusion may have a substantially T-shaped cross section. The protrusion may be arranged to engage with the slot formed in the body so as allow for the spacer to be slidably mounted to the body. Each of the locking elements may be inserted or housed in a spacer. In this way, the spacers provide the present invention with a means for adjusting the distance between the engagement formation and the distal edge(s), which means that the distance between the distance between the distal edge(s) and the tap to which the engagement formation engages is adjustable. This allows the present invention to be mounted to a variety of different sinks with different configurations.

According to a second aspect of the invention there is provided a sink comprising the device of the first aspect of the invention.

The sink of the second aspect of the invention may comprise any feature of the first aspect of the invention.

According to a third aspect of the invention there is provided a method of resisting rotation of a tap that has been fitted to a sink, the method comprising the steps of:
  a) providing a device comprising a body, at least one distal edge, and an engagement formation with an attachment means;
  b) engaging the engagement formation with a part of the tap; and
  c) securing the device to the part of the tap by using the attachment means; and
  d) contacting the at least one distal edge with a part of the sink remote from the tap.

The method of the third aspect of the invention may comprise any feature of the first or second aspects of the invention.

In particular, the attachment means may comprise one or more screws arranged to contact with the tap. The device may thus be secured to the tap by tightening each screw to form a depression in the tap. Each screw may be a grub screw (or set screw). Each screw or grub screw may comprise an engagement surface formed at its front end for biting into a part of a tap. The engagement surface may be pointed or V-shaped or a "dog-point" (i.e. cylindrical). The engagement surface may be rounded. The engagement surface may be a rounded point. The engagement surface may be a cone point. The engagement surface may be U-shaped.

According to a fourth aspect of the present invention, there is provided a device for resisting rotation of a first tap and a second tap that have been fitted to a sink, the device comprising: a body; a first engagement formation for engaging with a part of the first tap; and a second engagement formation for engaging with a part of the second tap.

In this way, the fourth aspect of the present invention is a device that connects a first tap and a second tap together in a fixed arrangement since the first engagement formation is connected to the second engagement formation. Thus, each tap is retained in a fixed position and a fixed orientation. Accordingly, if the first tap becomes loose from the sink during use, rotational movement of the loose first tap will attempt to rotate the engaged first engagement formation, which will thus attempt to rotate the body about the first engagement formation, which will thus attempt to rotate the second engagement formation about the first engagement formation. However, it is not possible to rotate the second the second engagement formation because it is engaged with the second tap. The second engagement formation is thus physically blocked from rotating by its engagement with the second tap. Since the second engagement formation cannot rotate, the body cannot rotate and therefore the first engagement formation, and consequently the first tap cannot rotate. Accordingly, the above problem of a tap freely rotating is mitigated. Indeed, the fourth aspect of the present invention would prevent both the first tap and the second tap from rotating since each tap is secured thereto.

The body may be elongate. The body may be substantially cuboid in shape. Thus, the body may have a substantially rectangular profile. The body may be formed from a rigid material. The body may be formed from metal or a plastic.

The body may extend between the first engagement formation and the second engagement formation. Thus, the first engagement formation and the second engagement formation may be disposed oppositely about the body.

The length of the body may be adjustable. The length of the body may be adjustable by using an adjustment means. The body may comprise a first body portion connected to a second body portion. The adjustment means may connect the first body portion to the second body portion. Each body portion may be tubular or substantially tubular. The first body portion may be larger or have a larger diameter than the second body portion such that the larger first portion of the body can slide over the smaller second portion of the body. Thus, the smaller second portion of the body may slide within the larger first portion of the body. The larger first portion of the body may have a larger width and/or depth and/or height than the smaller second portion of the body. In this way, the length of the body is adjustable to allow the engagement formations to be aligned with their respective pipes. This allows for the device to be used with a plurality of different sinks.

The first engagement formation may be arranged to fix to or engage with the underside of the first tap. In particular, the first engagement formation may be arranged to engage with a pipe of the first tap. Similarly, the second engagement formation may be arranged to fix to or engage with the underside of the second tap. In particular, the first engagement formation may be arranged to engage with a pipe of the second tap.

The first engagement formation may be integrally formed in the device. The second engagement formation may be integrally formed in the device.

The first engagement formation and/or the second engagement formation may be substantially toroidal. Thus, the first engagement formation and/or the second engagement formation may have a substantially circular profile.

The first engagement formation may comprise an aperture. Similarly, the second engagement formation may comprise an aperture. Each aperture may be substantially circular. In this way, each engagement formation may be provided with an aperture for placing over a pipe connected to a tap to engage the engagement formation with the tap.

The first engagement formation may comprise an attachment means. The second engagement formation may comprise an attachment means. Each attachment means may comprise one or more channels. Each attachment means may comprise a plurality of channels. Each channel may be integrally formed in the body. Each channel may be substantially cylindrical in shape. Each channel may comprise a screw thread on the inside surface of its circumferential wall. One or more channels may be oriented in the same longitudinal axis as the body. One more channels may be oriented perpendicular to the longitudinal axis of the body. One or more channels may be oriented at an angle to the longitudinal axis of the body. In particular, one or more channels may be oriented at 45° with respect to the longitudinal axis of the body. Each attachment means may comprise a screw. Each screw may sit within a channel. Each screw may comprise a screw thread on the outside circumferential surface of its body. Each screw may sit within a screw housing insert that can be inserted into a channel Each screw housing insert may comprise a cylindrical tube. Each cylindrical tube may have ridges provided on the outside surface of its circumferential wall for engagement with a corresponding surface of a channel Each screw housing insert may comprise a screw thread on the inside surface of its circumferential wall. Each screw may be a grub screw (or set screw). Each screw or grub screw may comprise an engagement surface formed at its front end for biting into a part of a tap. The engagement surface may be a pointed or V-shaped. The engagement surface may be rounded. The engagement surface may be a rounded point. The engagement surface may be a cone point. The engagement surface may be U-shaped or may be a "dog-point", i.e. cylindrical. Thus, each screw or grub screw may be arranged to contact with and create a depression on a pipe of the sink in order to fix the orientation of the connected tap relative to the sink. In this way, an attachment means may be provided for securely attaching an engagement formation, and therefore the device, to a tap.

The device may further comprise additional engagement formations for engaging with additional taps. For example, the device may comprise three or more engagement formations for engaging with three or more taps.

According to a fifth aspect of the invention there is provided a sink comprising the device of the first aspect of the invention.

The sink of the fifth aspect of the invention may comprise any feature of the fourth aspect of the invention.

According to a sixth aspect of the invention there is provided a method of resisting rotation of a first tap and a second tap that have been fitted to a sink, the method comprising the steps of:
  e) providing a device comprising a body, a first engagement formation with a first attachment means, and a second engagement formation with a second attachment means;
  f) engaging the first engagement formation with a part of the first tap and engaging the second engagement formation with a part of the second tap; and
  g) securing the device to the part of the first tap by using the first attachment means and securing the device to the part of the second tap by using the second attachment means.

The method of the sixth aspect of the invention may comprise any feature of the fourth or fifth aspects of the invention.

In particular, the first attachment means and the second attachment means may each comprise one or more grub screws arranged to contact with the first tap and the second tap. The device may thus be secured to the first tap and the second tap by tightening the grub screws to form a depression in the taps.

DETAILED DESCRIPTION OF THE INVENTION

In order that the invention may be more clearly understood embodiments thereof will now be described, by way of examples only, with reference to the accompanying drawings, of which:

FIG. 1 is discussed above in the "Background to the Invention" and illustrates a sink 1 comprising a tap 3 according to the prior art.

Figure 2:
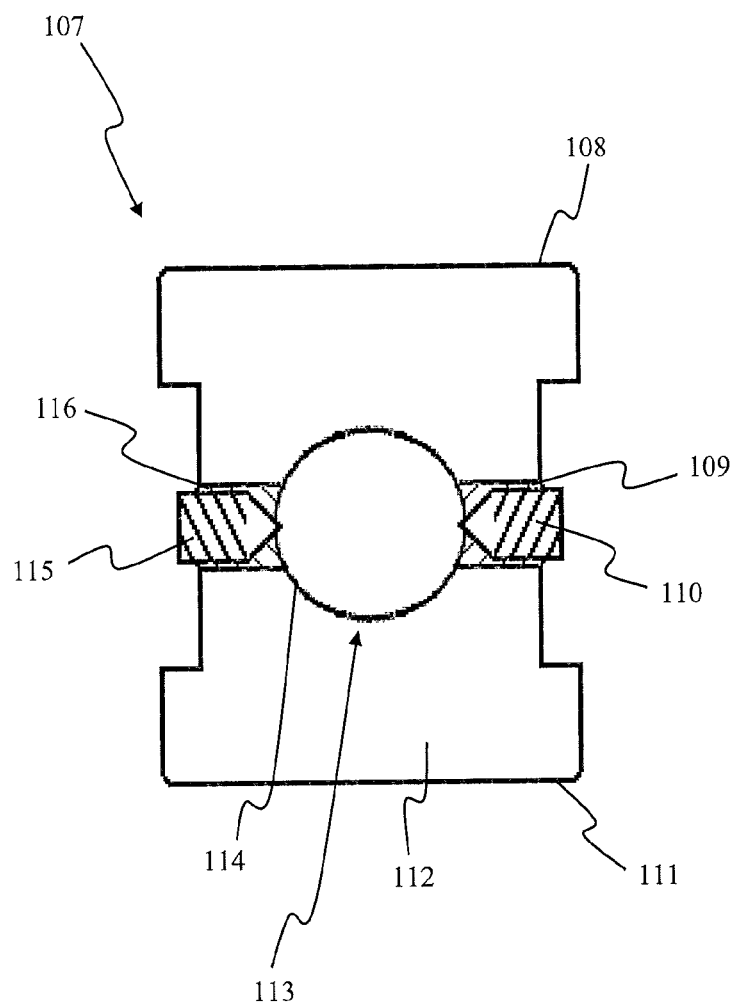
FIG. 2 is a cross-section of a plan view of a first embodiment of the present invention.

Referring to FIG. 2, a device 107 comprises a rigid body 112 and an engagement formation 113. The body 112 has an I-shaped profile. The engagement formation 113 is disposed in the centre of the body 112.

The device 107 comprises a first distal edge 108 and a second distal edge 111 provided oppositely about the engagement formation 113. The first distal edge 108 and the second distal edge 111 are each arranged to abut and interact with a part of the sink 1 that is remote from the engagement formation 113, particularly a downwardly depending part of the sink 1. Each of the distal edges 108, 111 comprises a flat surface for contacting with a part of a sink 1, and curved corners to assist in fitting the device 107 to the sink 1.

The engagement formation 113 comprises a substantially circular aperture 114 and an attachment means. The attachment means comprises a first grub screw 110 and a second grub screw 115. The first grub screw 110 sits within a substantially cylindrical first channel 109 that houses a substantially cylindrical screw housing insert comprising a screw thread formed on the internal surface of its circumferential wall. The second grub screw 115 also sits within a substantially cylindrical second channel 16 that houses a substantially cylindrical screw housing insert comprising a screw thread formed on the internal surface of its circumferential wall. Each of the grub screws 110, 115 comprise a substantially cylindrical body with an external screw thread provided on the outside circumferential surface of its body, a front end with a V-shaped point for biting into a surface, and a screw head formed on its rear end. In other embodiments, the front end may comprise a U-shaped point or a cylindrical "dog-point" for biting into a surface.

The attachment means is formed in the middle part of the I-shaped body 112 so as to reduce the depth of the channels 109, 116.

Figure 1:
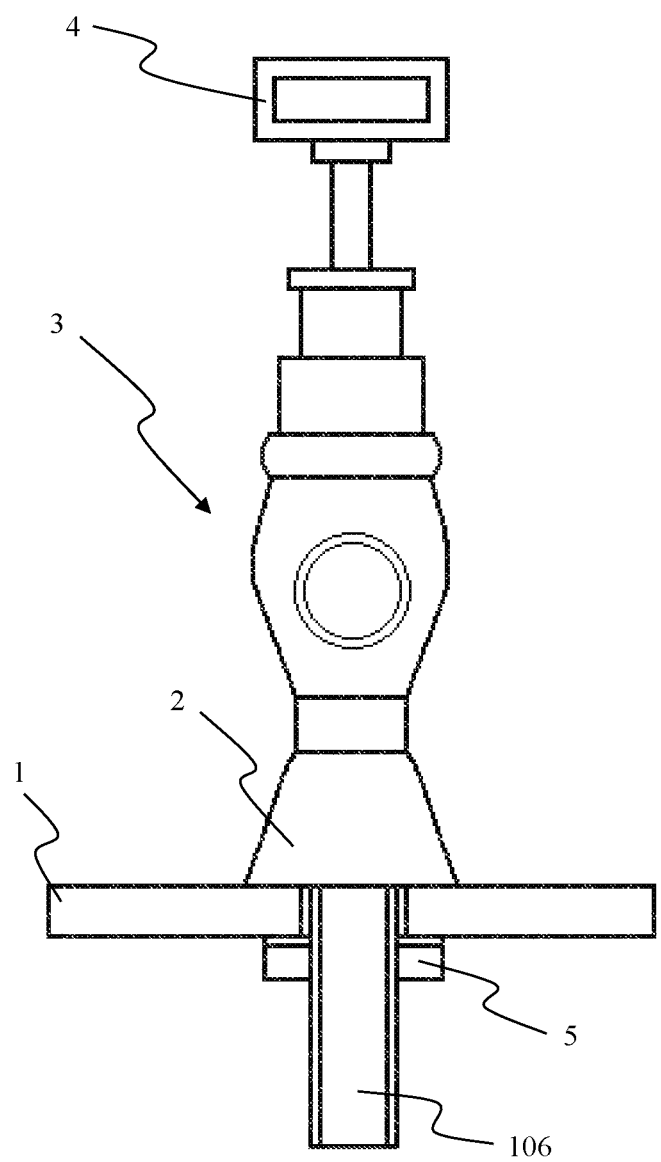
FIG. 1 is a part cross-section view of a known sink comprising a tap.
Figure 3:
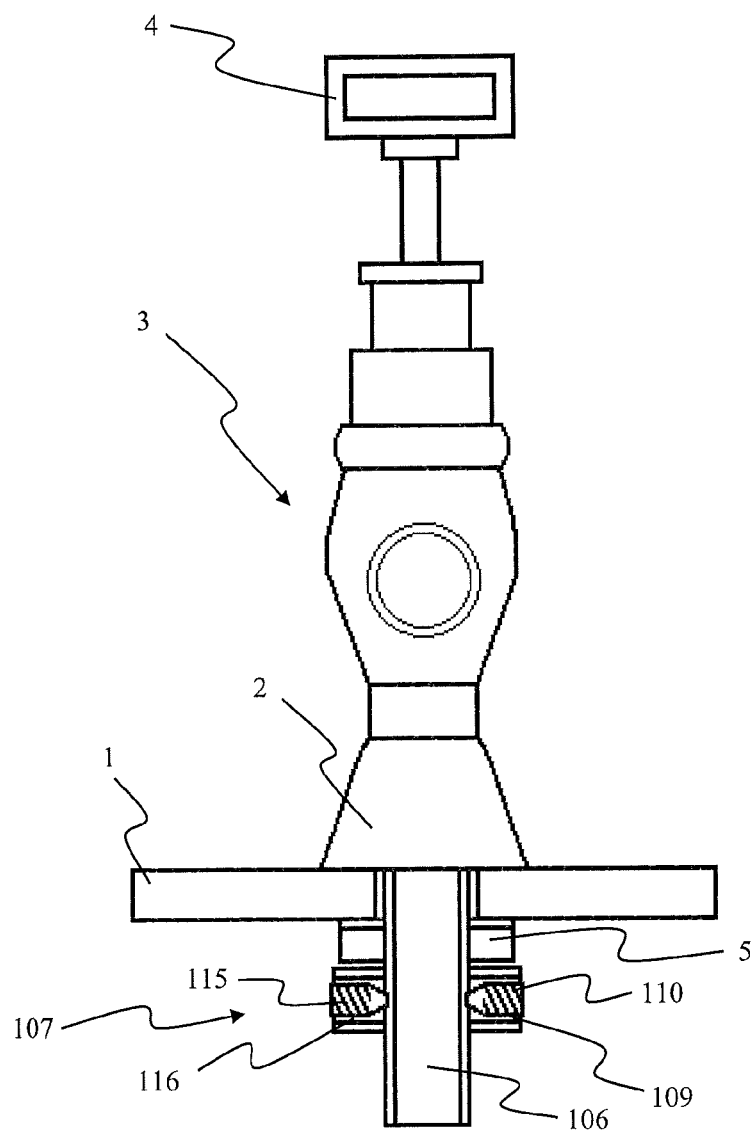
FIG. 3 is a part cross-section view of the sink shown in FIG. 1, with the first embodiment of the present invention shown in FIG. 2 applied to the tap and the sink in order to resist rotation of the tap.
Figure 4:
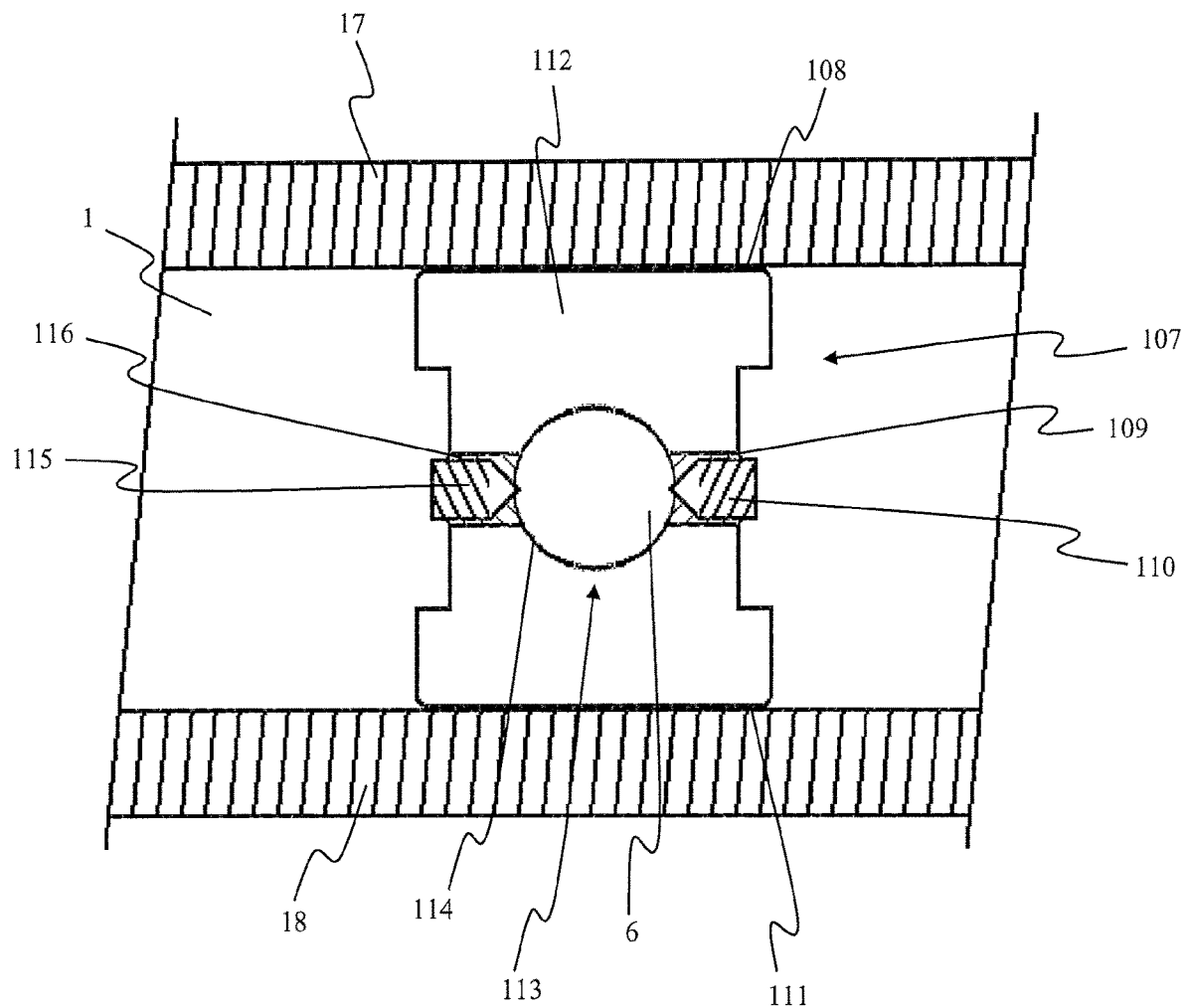
FIG. 4 is a part cross-section view of the underside of the sink shown in FIG. 3.

Referring to FIGS. 3 and 4, the device 107 has been fitted to the underside of the tap 3 of the sink 1 shown in FIG. 1.

In order to fit the device 107 to the tap 3 and the sink 1, the engagement formation 113 is engaged with the pipe 106 by placing the aperture 114 on to the pipe 106. Thus, the pipe 106 is effectively inserted into the aperture 114. The device 107 is then pressed upwards towards the sink 1 into a position where the first distal edge 108 of the body 112 is in contact with a first downwardly depending part 17 of the sink 1 and the second distal edge 111 of the body 112 is in contact with a second downwardly depending part 18 of the sink 1. The downwardly depending parts 17, 18 are remote from the tap 3 and provide a (substantially) vertical (in normal use) surface for the distal edges 108, 111 to contact against. The device 107 may be pressed up flush with the nut 5 if desired, although in this embodiment there is a gap between the device 107 and the nut 5. The device 107 is now partially fitted to the underside of the first tap 3 and the sink 1.

To securely fit the device 107 to the tap 3, a user tightens the first grub screw 110 and the second grub screw 115 so that they protrude into the aperture 114. Thus, the grub screws 110, 115 both contact and engage with an external surface of the pipe 106. Specifically, the V-shaped front ends of each grub screw 110, 115 bite into the outside surface of the pipe 106, forming a depression or deformation therein and locking the device 107 to the pipe 106.

As described above, in normal use of the sink 1 the nut 5 secures the tap 3 to prevent it from rotating in place. However, when the nut 5 fails, the tap 3 may freely rotate. Also, the nut 5 may fail and allow the tap 3 to rotate if the tap 3 is vandalised and forced to rotate.

The device 107 provides a means for resisting and ideally preventing rotation of the tap 3 by connecting the tap 3 to the sink 1 in a fixed arrangement. If the tap 3 becomes loose from the sink 1 then due to its engagement with the engagement formation 113 of the device 107, rotation of the loose tap 3 would attempt to rotate the body 112 of the device 107 about the loose tap 3. However, the first distal edge 108 is in contact with the first downwardly depending part 17 of the sink 1 and the second distal edge 111 is in contact with the second downwardly depending part 18 of the sink 1. The body 112 is therefore in contact with the sink 1, in two separate regions in this embodiment, and so it cannot rotate about the tap 3 because its contact with the sink 1 physically blocks it from doing so. Consequently, with the device 107 fitted, the loose tap 3 cannot rotate relative to sink 1.

Figure 5:
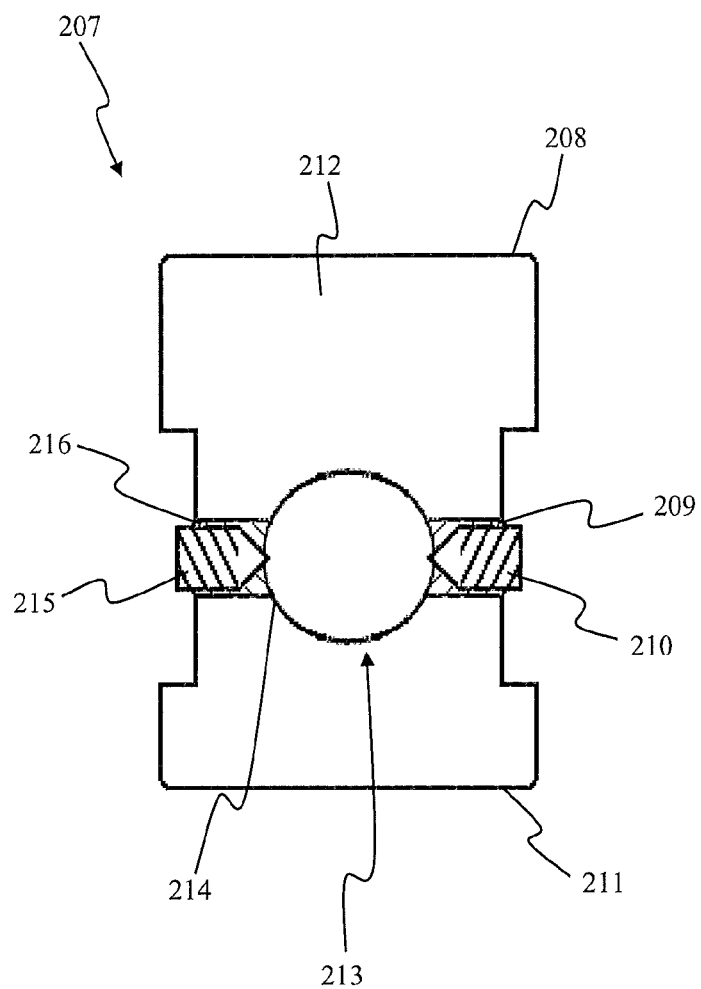
FIG. 5 is a cross-section of a plan view of a second embodiment of the present invention.

Referring to FIG. 5, a second embodiment of the invention is shown, in which the device 207 comprises a body 212 that has a slightly different shape to that of the first embodiment, which enables the device 27 to be used on a differently shaped sink 1 where the tap 3 is located in a different position relative to a first downwardly depending part 17 and a second downwardly depending part 18 of the sink 1. In this embodiment, the body 212 is still substantially I-shaped but the top portion of the "I" is larger than the bottom portion of the "I". This configuration allows the first distal edge 208 and the second distal edge 211 to contact their respective parts 17, 18 of the differently arranged sink 1 and tap 3.

Figure 6:
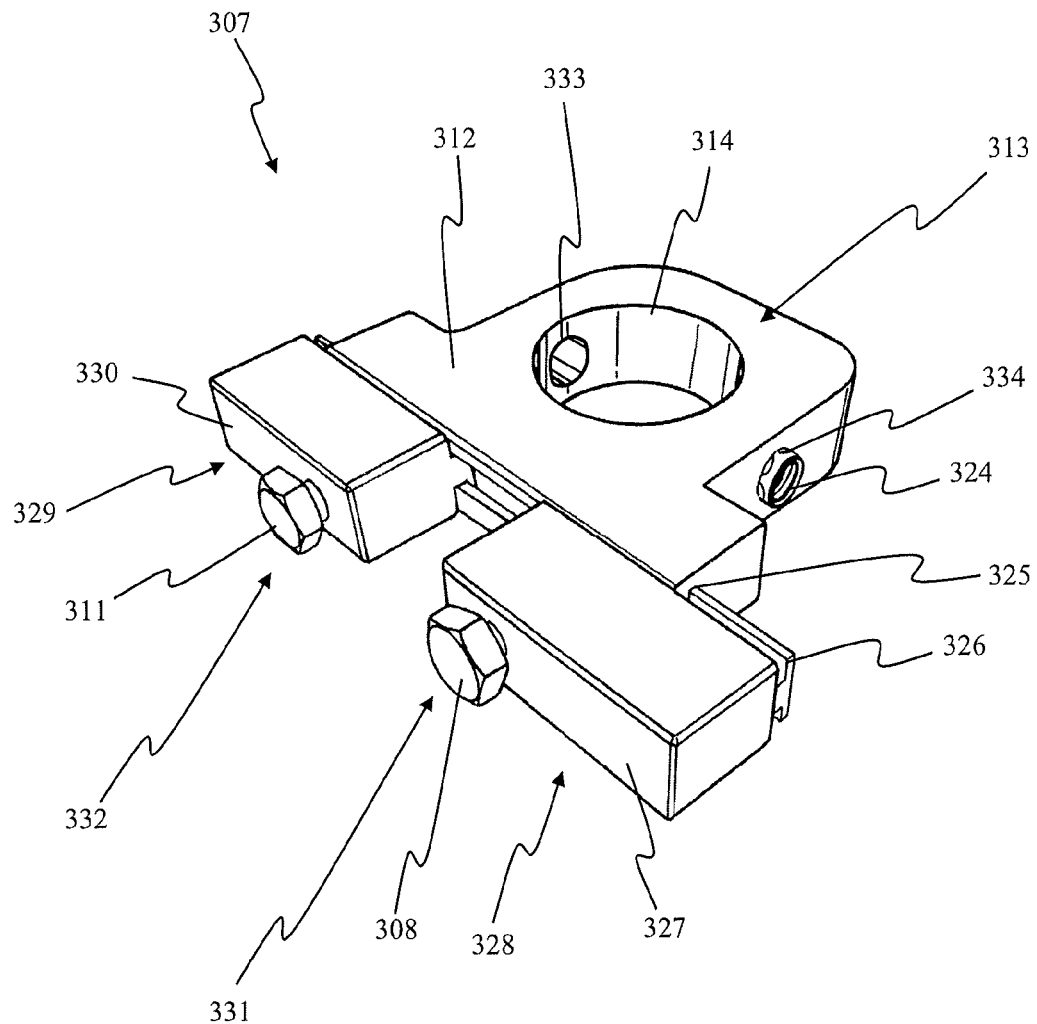
FIG. 6 is a perspective view of a third embodiment of the present invention.
Figure 7:
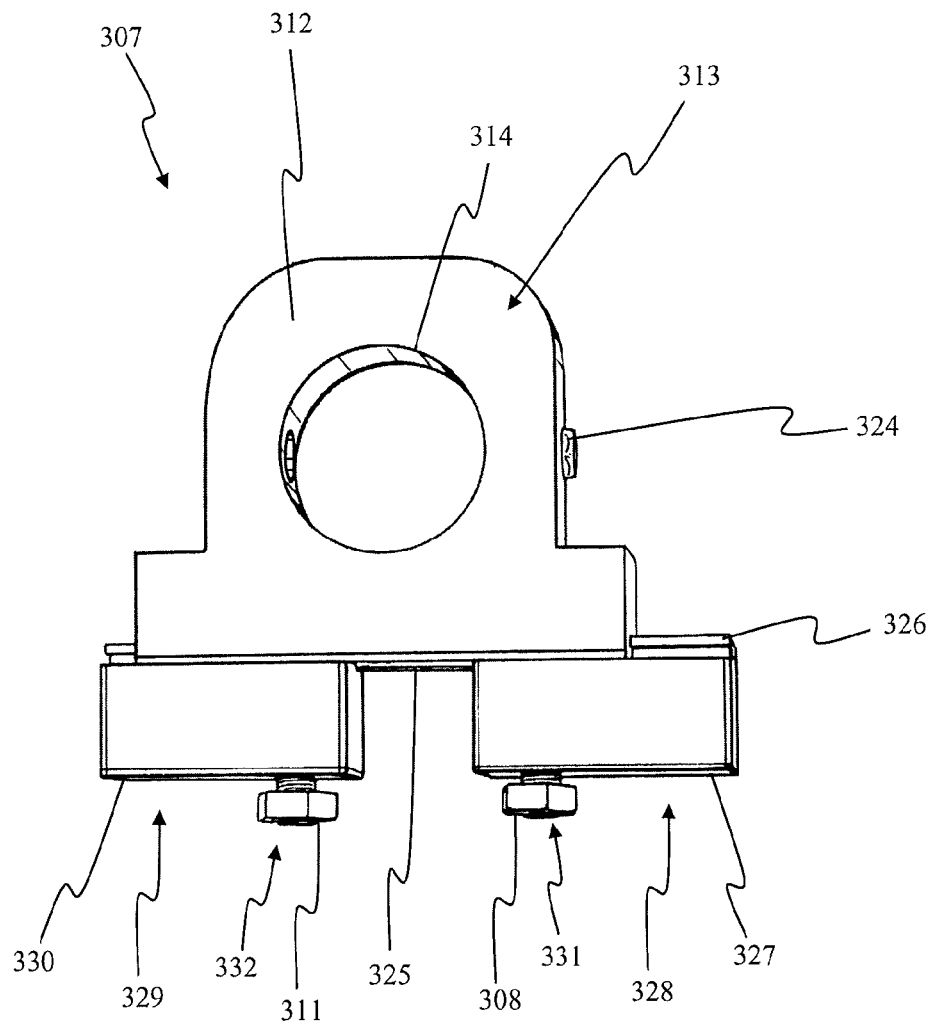
FIG. 7 is a plan view of the embodiment shown in FIG. 6.
Figure 8:
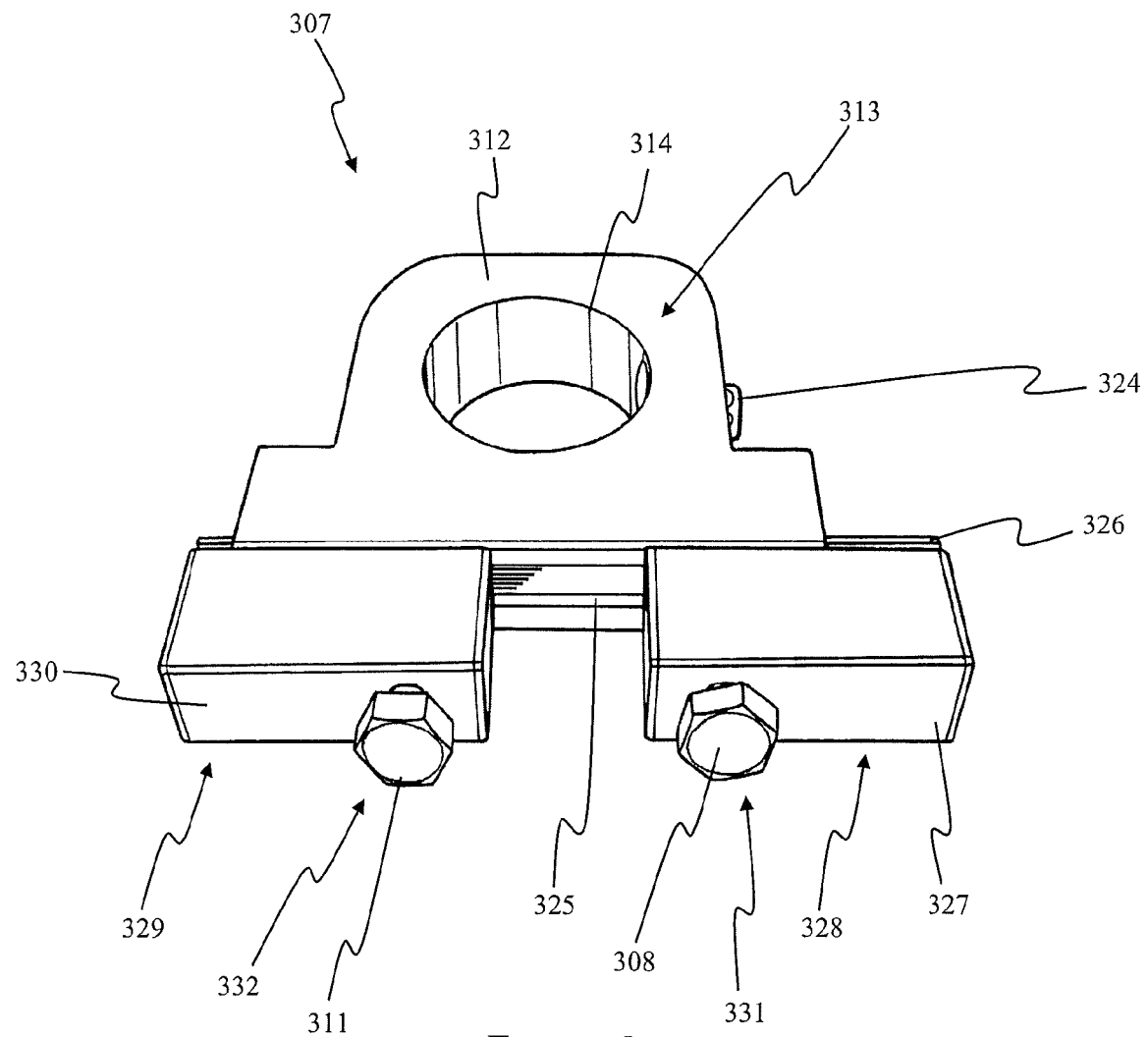
FIG. 8 is a perspective view of the embodiment shown in FIGS. 6 and 7.

Referring to FIGS. 6-8, a third embodiment of the invention is shown. A device 307 for resisting rotation of a tap fitted to a sink comprises a rigid body 312 having an engagement formation 313 in the form of an aperture 314 located towards the centre of the body 312 and an attachment means (as described above but not shown in these Figures). The body 312 may be formed from any rigid material and this embodiment the body 312 is formed from a polymer.

The device 307 comprises a first distal edge 308 and a second distal edge 311 connected to the body 312 and disposed away from the engagement formation 313. The first distal edge 308 and the second distal edge 311 are each arranged to abut and interact with a part of the sink 1 that is remote from the engagement formation 313, particularly a downwardly depending part of the sink 1. Each of the distal edges 308, 311 comprises a flat surface for contacting with a part of a sink 1, and curved corners to assist in fitting the device 307 to the sink 1.

The body 312 is substantially T-shaped and comprises a first channel 334 and a second channel 333. Each channel 334, 333 is formed as an aperture in the body 312 and has a substantially circular cross section. In this embodiment, the second channel 333 is unused, whilst a screw housing insert 324 sits within the first channel 324. The screw housing insert 324 is a cylindrical tube comprising a screw thread on the inside surface of its circumferential wall, for engagement with a corresponding screw thread on the outside wall of an attachment means such as a grub screw as described above.

A slot 325 is cut into a perimetrical edge of the body 312 at a location distal to the engagement formation 313. The slot 325 is straight and has a constant, substantially C-shaped cross section.

The device 307 also comprises a first cuboidal spacer 328 and a second cuboidal spacer 329 that assist in disposing the first and second distal edges 308, 311 in their positions remote from the engagement formation 13. Each of the spacers 328, 329 comprises a protrusion 326 that projects from, and along the whole of, a long side of the spacer 328, 329. Each protrusion has a constant, substantially T-shaped cross section.

The protrusion 326 of each spacer 328, 329 is thus arranged to engage with the slot 325 in the body 312, which allows the spacers 328, 329 to slidably mount to the body 312. The spacers 328, 329 are slidable within the slot 325 so that they can each be moved relative to the engagement formation 313 and relative to one another. The first and second spacers 328, 329 are substantially the same shape and size so that when they are mounted to the body 312, their leading faces 327, 330 are aligned with one another.

In this embodiment, the first distal edge 308 is provided on a locking element in the form of a first bolt 331 which is screwed into and engaged with a corresponding hole in the first spacer 328 such that the first bolt 331 projects outwardly from the leading face 327 of the first spacer 328, in a direction radially outwardly relative to the aperture 314. In addition, the second distal edge 311 is provided on a locking element in the form of a second bolt 332 which is screwed into and engaged with a corresponding hole in the second spacer 330 such that the second bolt 332 also projects outwardly from the leading face 330 of the second spacer 329, in a direction radially outwardly relative to the engagement formation 313.

The first and second bolts 331, 332 each comprise a screw thread for engaging with the corresponding holes formed in the first and second spacers 328, 329, and a hexagonal head for engagement with a spanner or a wrench, allowing the bolts 331, 332 to be rotated so that they can be screwed into and out of the spacers 328, 329. This enables the first distal edge 308 and the second distal edge 311 to be moved towards and away from the engagement formation 313, and relative to one another.

Therefore, in this embodiment, the spacers 328, 329 provide for relatively large adjustments of the distance between the first and second distal edges 308, 311 and the engagement formation 313, and the bolts 308, 311 provide for relatively fine adjustments of the distance between the first and second distal edges 308, 311 and the engagement formation 313.

It will be understood that in other embodiments not shown in the drawings, the first and/or second spacers 328, 329 may be sized and/or shaped differently, to one another and/or to the size and shape shown in FIGS. 6-8 and described above. Additionally, in other embodiments, the first and/or second bolts 331, 332 may be sized and/or shaped differently, to one another and/or to the size and shape shown in FIGS. 6-8 and described above.

In use, before assembling and fitting the device 307 to a sink 1 and a tap 3, a user must measure the distance between the pipe 6 connected to the tap 3 and the edge of a surface of a downwardly depending part 17 of the sink 1. Based on this measurement, the user can select appropriately sized spacers 328, 329 to substantially fill the gap between the body 312 and a downwardly depending, substantially vertically oriented, part 17 of the sink 1.

The device 307 is assembled by sliding the protrusion 326 of each spacer 328, 329 into the corresponding slot 325 provided in the body 312. The spacers 328, 329 are then slid into an initial position within the slot, relative to one another and the relative to the body 312. The first and second bolts 331, 332 are inserted into corresponding holes provided in the first and second spacers 328, 329, respectively. Each bolt 331, 332 is inserted fully into its spacers 328, 329. A screw housing insert 324 is pressed into the first channel 334. In other embodiments, a screw housing insert 324 may be pressed into each channel 333, 334.

The device 307 is fitted to the tap 3 by placing the aperture 314 of the engagement 313 over the pipe 6 that is connected to the tap. Thus, the pipe 6 is effectively inserted through the aperture 314. The device 307 is then pressed upwards towards the sink 1 into an engaged position where it is adjacent or in contact with a part of the sink, such as the nut 5. The device 307 is oriented such that the slot 325 faces towards the substantially vertical, downwardly depending part 17 of the sink 1. An attachment means such as a grub screw with a sharp V-shaped front end is then screwed into the screw housing insert 324. The front end of the grub screw bites into the outside surface of the pipe 6, forming a depression or deformation in the pipe 6 and securely attaching the device 307 to the pipe 6.

Due to the sizing of the spacers 328, 329, in this locked position, there is a small gap between the first and second distal edges 308, 311 and the downwardly depending part 17 of the sink 1, which provides a vertical surface for the distal edges 308, 311 to abut against.

The gap between the distal edges 308, 311 and the downwardly depending part 17 of the sink 1 is reduced and then eliminated by the user unscrewing the bolts 331, 332 from their spacer 328, 329 using a spanner or a wrench. As the bolts 331, 332 are unscrewed from the spacers 328, 329, the distal edges 308, 311 move towards and then come into the contact with the substantially vertical surface of the downwardly depending part 17. The bolts 331, 332 thus act as adjustable locking elements to bridge the gap between the spacers 328, 329 and the downwardly depending part 17.

The device 307 is now in its secured position, with the distal edges 308, 311 abutting against a part of the sink 1 that is remote from the tap 3.

As described above, in normal use of the sink 1 the nut 5 secures the tap 3 to prevent it from rotating in place. However, when the nut 5 fails, the tap 3 may accidentally freely rotate. Also, the nut 5 may fail and allow the tap 3 to rotate if the tap 3 is vandalised and forced to rotate.

In its secured position, the device 307 resists rotation of the tap 3 by connecting the tap 3 to the sink 1 in a fixed arrangement. If the tap 3 becomes loose during use or due to vandalism, since it is engaged with the device 307, rotation of the loose tap 3 would attempt to rotate the device 307 about the loose tap 3. However, the first and second distal edges 308, 311 bears against and is in contact with the downwardly depending part 17 of the sink 1, which is remote from the tap 3. The device 307 is therefore blocked from rotating by the downwardly depending part 17 of the sink 1, which resists and prevents rotation of the loose tap 3 relative to sink 1, even if the nuts 5 is damaged.

With this arrangement, the device 307 uses the first and second distal edges 308, 311 in combination features of the shape of the sink1 in order to rotationally secure the tap 3.

Figure 9:
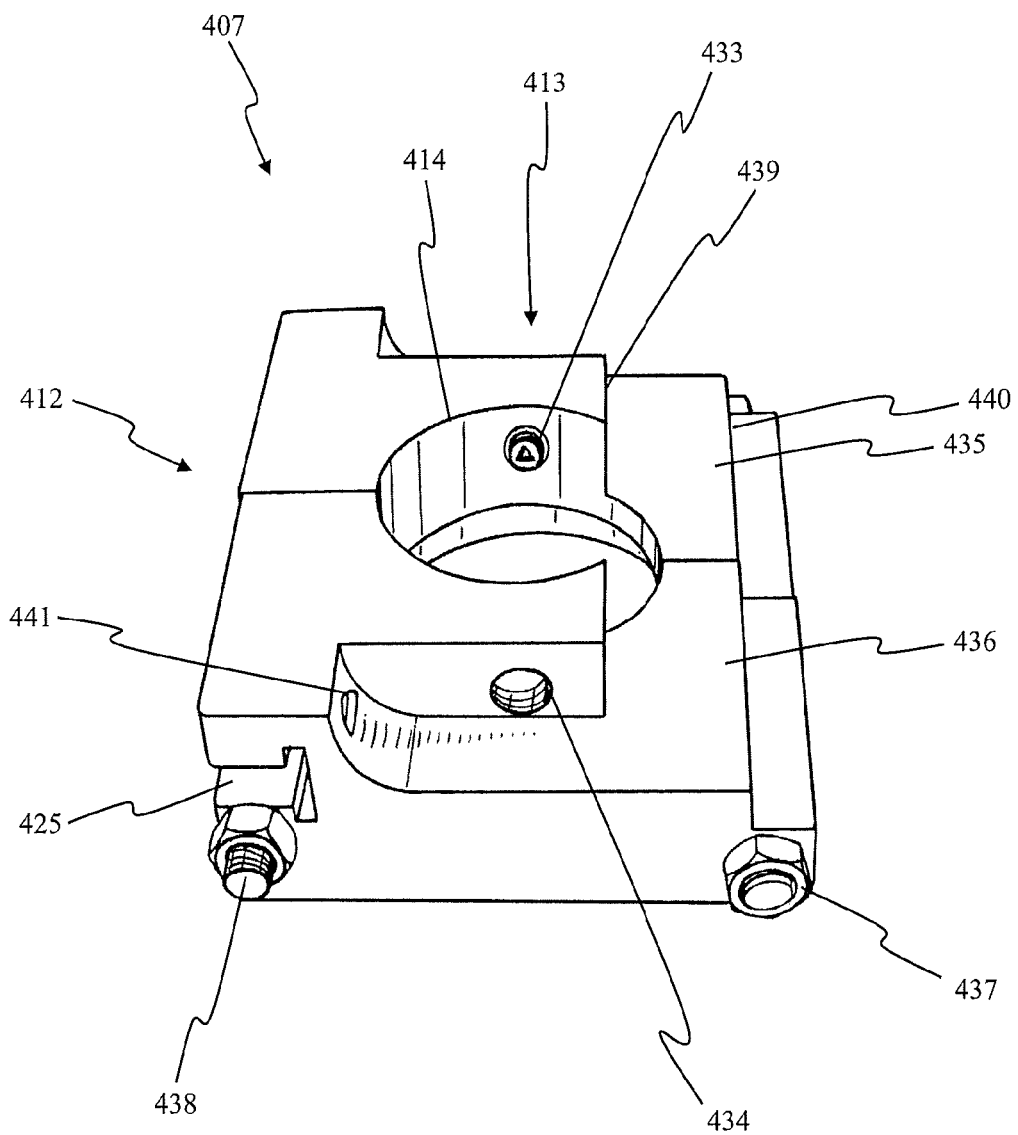
FIG. 9 is a perspective view of a fourth embodiment of the present invention.

Referring to FIG. 9, a fourth embodiment of the invention is shown. The features of the device 407 are mostly the same as the device 307 shown in FIGS. 6-8 and described above.

However, in this embodiment, the body 412 is cuboidal and is formed from a first body portion 435 and a second body portion 436 that are secured together using a set of nuts 437 and bolts 438. Also, a first step 439 and a second step 440 are cut into each body portion 435, 436 to allow easier and more secure fixing of the device 407 to the underside of a sink 1. The steps 439, 440 correspond to features of the underside of the sink 1. Also, the device 407 is made from a metal such as aluminium rather than a polymer.

In addition, the spacers 428, 429 and the bolts 431, 432 are not shown, although the slot 425 with which the spacers slidably engage is shown. Alternatively, the bolts 431, 432 may be inserted directly into holes 441 in the body 412.

The method of fixing the device 407 shown in FIG. 9 to a sink 1 and a tap 3 is substantially the same as described above with reference to FIGS. 6-8. However, each body portion 435, 436 is assembled separately and then attached to one another around the pipe 6 of the sink 1. The device 407 of this embodiment is particularly useful if the end of the pipe 6 is damaged.

Figure 10:
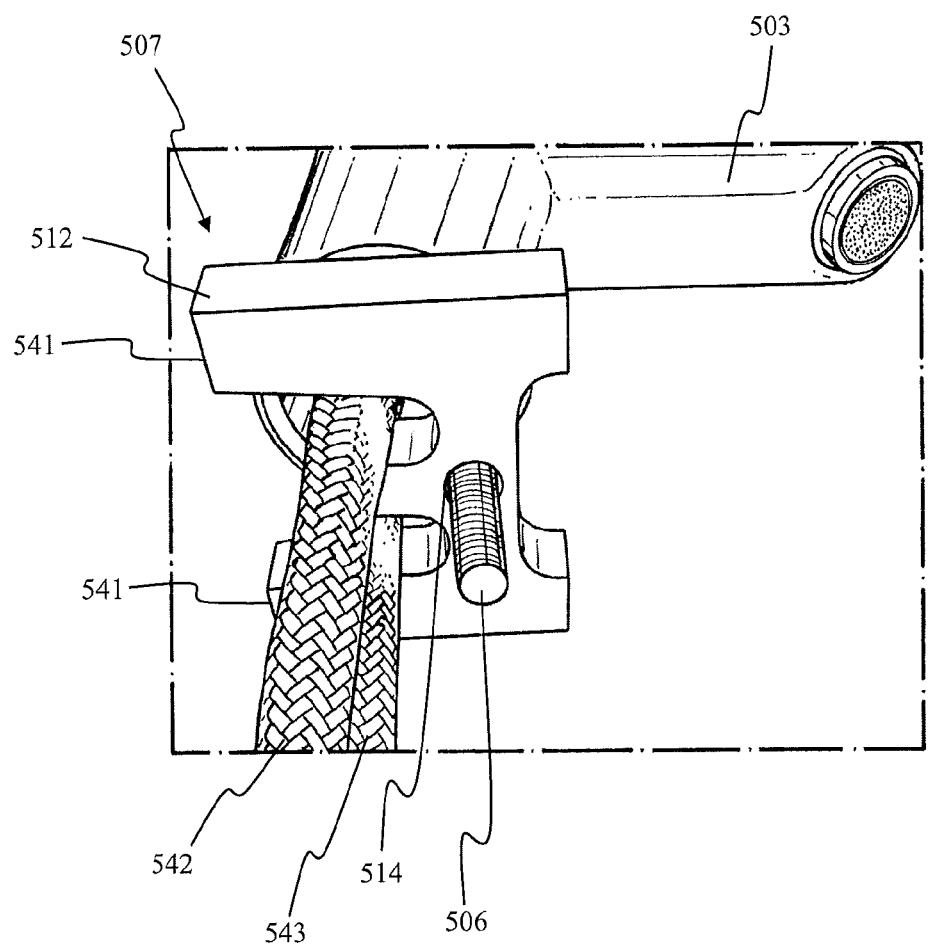
FIG. 10 is a perspective view of a fifth embodiment of the present invention applied to a tap.

Referring to FIG. 10, a fifth embodiment of the invention is shown. The features of the device 507 are mostly the same as the device 307 shown in FIGS. 6-8 and described above.

However, rather than being substantially T-shaped, the body 512 is substantially M-shaped so that it can fit around the hot water line 542 and the cold water line 543 of the tap 503. In addition, the spacers and the bolts are not shown, although a set of holes 541 in the body 512 are shown, into which bolts 531, 532 can be inserted. The attachment means engages with a rod 506 of a tap 503, which is analogous to the pipe 6 in other embodiments. Also, a slot 525 may be provided in the body 512 for receiving spacers 528, 529.

Also, the device 507 is made from a metal such as aluminium rather than a polymer.

The method of fixing the device 507 shown in FIG. 10 to a sink 1 and a tap 503 is substantially the same as described above with reference to FIGS. 6-8.

Figure 11:
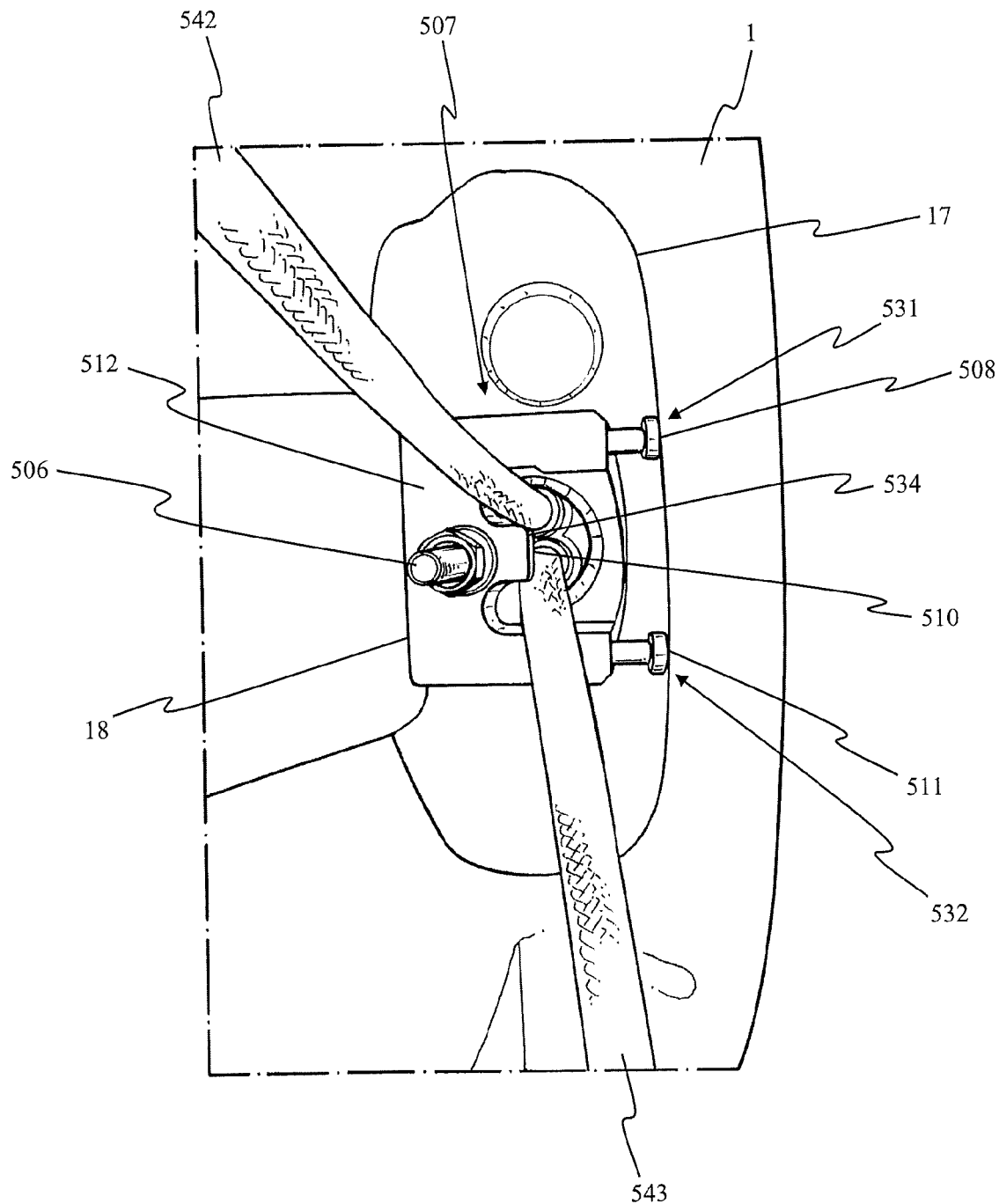
FIG. 11 is a part cross-section view of a known sink comprising a first tap and a second tap.

Referring to FIG. 11, the fifth embodiment of the invention illustrated in FIG. 10 is shown fitted to the underside of a sink 1. The device 507 has been engaged with the tap 503 by placing the aperture 514 over the rod 506. A nut has been threaded on to the rod 506 in order to lift the device 507 upwards towards the tap 503. The device 507 is attached to the rod 506 by use of a grub screw 510 with a V-shaped front end provided within a channel 534. A bolt 531, 532 has been screwed into each hole 541 of the device 507.

In its fitted position, a distal edge provided on the body 512 of the device 507 is contacting with a second downwardly depending part 18 of the sink 1, which projects away from the tap 503. Also, the bolts 531, 532 have been unscrewed from their respective holes 541 so that distal edges 508, 511 provided by the bolts 531, 532 are contacting with a first downwardly depending part of the sink 1, which also projects away from the sink 1. In this fitted position, unwanted rotation of the tap 503 is prevented in the manner described above.

Figure 12:
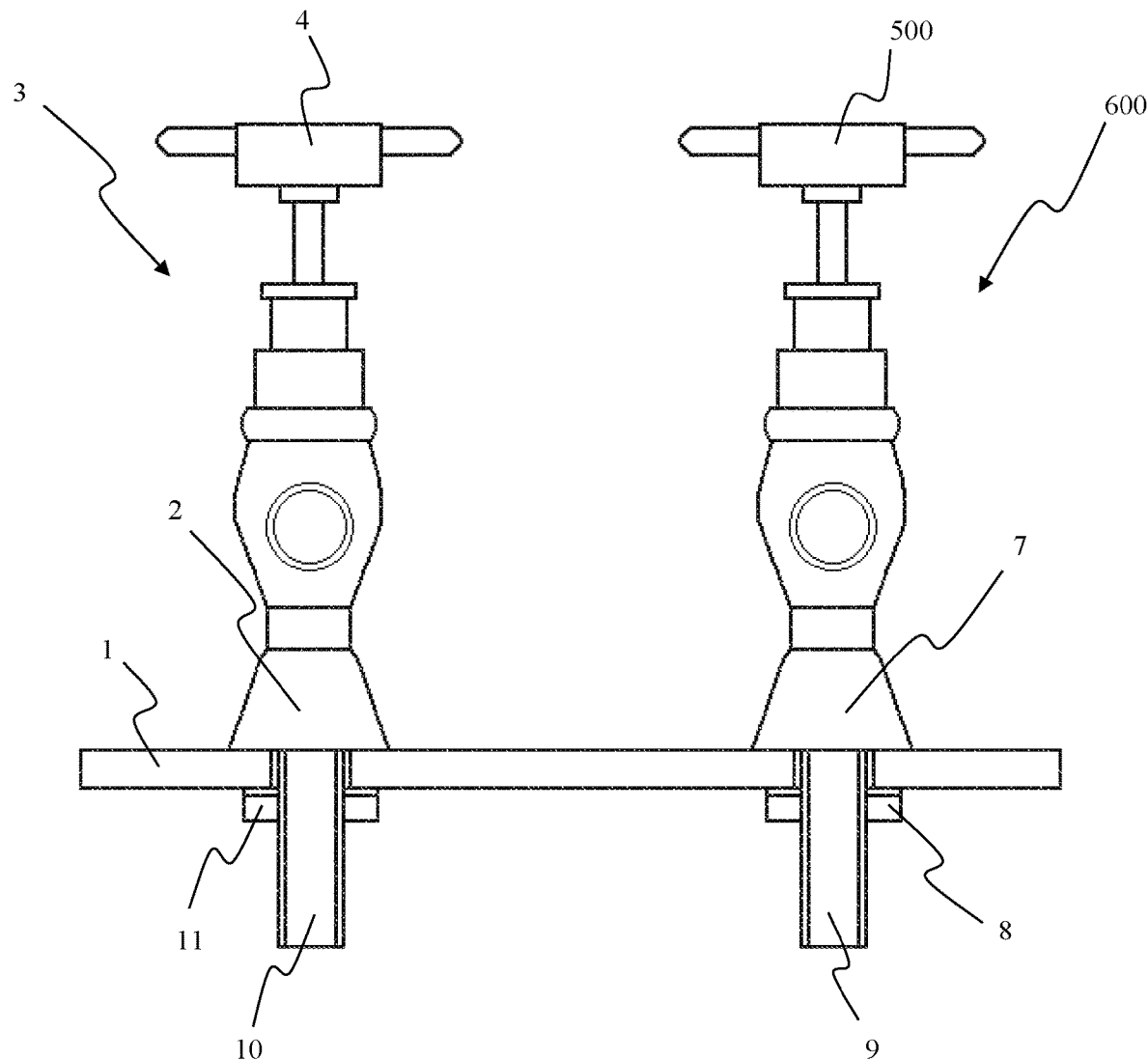
FIG. 12 is a part cross-section view of a known sink comprising a first tap and a second tap.

As mentioned above, FIG. 12 shows cross-section of a known arrangement comprising a sink 1 with a first tap (or faucet) 3 and a second tap (or faucet) 6 that are the same as the tap 3 shown in FIG. 1.

Figure 13:
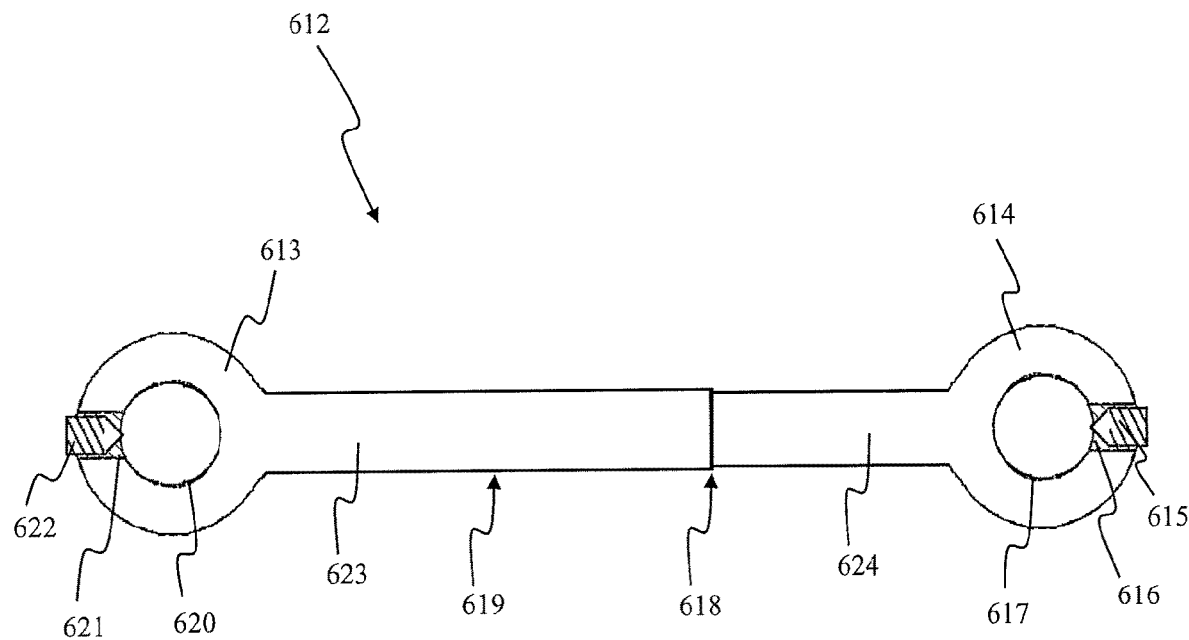
FIG. 13 is a cross section of a plan view of a sixth embodiment of the present invention.

Over time, the repeated counter-clockwise and clockwise turning of the handles 4, 500 of the taps 3,600 may cause the taps 3, 600 to become rotationally unsecured so that each tap 3, 600 can freely rotate whilst fitted in its respective hole in the sink 1. This problem may be caused by, for example, the nuts 11, 8 loosening on the screw thread of the pipes 10, 9 thereby reducing the compressive force between the nuts 11, 8 and the abutment portions 2, 7, or by the nuts 11, 8 wearing away the lower surface of the sink 1 so that it becomes smooth, thereby lowering the frictional force between the nuts 11, 8 and the lower surface of the sink 1, or by vandalism. Referring to FIG. 13, a sixth embodiment of the invention is shown. A device 612 comprises an elongate and rigid body 619 connecting a first engagement formation 613 to a second engagement formation 614. The first engagement formation 613 and the second engagement formation 614 are disposed at opposing ends of the body 619.

The body 619 comprises a first body portion 623 connected to a second body portion 642. The body portions 623, 624 are connected together by an adjustment means 618. In this embodiment, each body portion 623, 624 is tubular and the first body portion 623 has a larger diameter than the second body portion 624 such that the second body portion 623 is slidable within the first body portion 624 to adjust the length of the body 619.

The first engagement formation 613 comprises a substantially circular first aperture 620 and a first attachment means. The first attachment means comprises a first grub screw 622. The first grub screw 622 sits within a substantially cylindrical first channel 621 that has a screw thread formed on its inside circumferential surface.

The second engagement formation 614 comprises a substantially circular second aperture 617 and a second attachment means. The second attachment means comprises a second grub screw 615. The second grub screw 615 sits within a substantially cylindrical second channel 616 that has a screw thread formed on its inside circumferential surface.

Each of the grub screws 622, 615 comprise a substantially cylindrical body with an external screw thread provided on the outside surface of its body, a front end with a V-shaped point for biting into a surface, and a screw head formed on its rear end. In other embodiments, the front end may comprise a U-shaped point or a cylindrical "dog-point" for biting into a surface.

Figure 14:
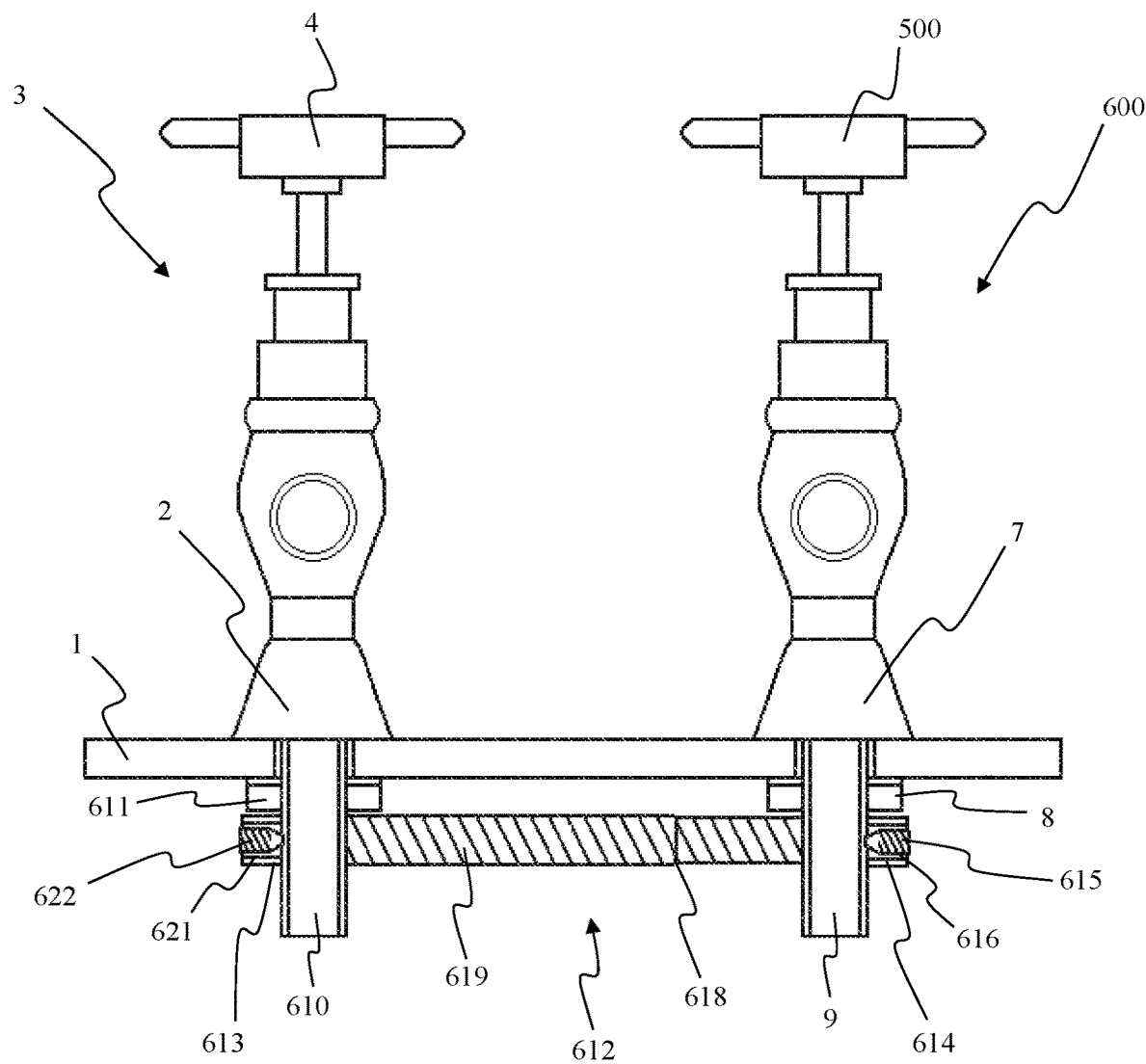
FIG. 14 is a part cross-section view of the sink shown in FIG. 12, with the embodiment of the present invention shown in FIG. 13 applied to the first tap and the second tap in order to resist rotation of the taps.

Referring to FIG. 14, the device 612 has been fitted to the underside of the sink 1 and the first tap 3 and the second tap 600 shown in FIG. 1.

In order to fit the device 612 to the taps 3, 600, the length of the elongate body 619 is first adjusted using the adjustment means 618 so that the first aperture 620 is aligned with the first pipe 10 and the second aperture 617 is aligned with the second pipe 9. The first engagement formation 613 and the second engagement formation 14 are then engaged with the first pipe 10 and the second pipe 9, respectively, by placing the first aperture 620 on to the first pipe 10 and placing the second aperture 617 on to the second pipe 10. Thus, the first pipe 10 and second pipe 9 are effectively inserted into the first aperture 620 and the second aperture 617. The device 612 is then pressed upwards towards the sink 1 into its engaged position. The device 612 may be pressed up flush with the first nut 11 and the second nut 8, although in this embodiment there is a gap between the device 612 and the nuts 11, 8. The device 612 is now partially fitted to the underside of the first and second taps 3, 600.

To secure the device 612 to the taps 3, 600, the user tightens the first grub screw 622 and the second grub screw 615 so that they protrude into the first aperture 620 and the second aperture 617, respectively. As they are tightened, the first grub screw 622 contacts and engages with the outside circumferential surface of the first pipe 10, and the second grub screw 615 contacts and engages with the outside circumferential surface of the second pipe 9. Specifically, the V-shaped front ends of each grub screw 622, 620 bite into the outside circumferential surface of their respective pipe 10, 9 and form a depression or deformation therein, which locks the orientation of the pipe. This engagement and locking prevents the device 612 from being moved axially with respect to the apertures, towards and away from the sink 1.

As described above, in normal use of the sink 1 the nuts 11, 8 secure the taps 3, 600 to the sink 1 to prevent them from rotating in place. However, when one of the nuts 11, 8 fails, its respective tap 3, 600 may freely rotate. This problem can occur even if the other nut 11, 8 is working as intended because the first tap 3 and first nut 11 are independent of the second tap 600 and the second nut 8.

The device 612 provides a means for resisting and preventing rotation of both taps 3, 600 by connecting the two taps 3, 600 together in a fixed arrangement. Thus, for example, if the first tap 3 becomes loose then due to the body 619 acting as a lever, rotation of the loose first tap 3 would attempt to rotate the second tap 600 about the loose first tap 3. However, the second tap 600 is fitted to the sink 1 and it therefore cannot rotate about the first tap 3 as it is physically blocked from doing so by the sink 1. Consequently, the loose first tap 3 cannot rotate.

Indeed, even if both nuts 11, 8 fail completely, the device 612 will prevent either tap 3, 600 from rotating since they are connected together in a fixed arrangement.

Figure 15:
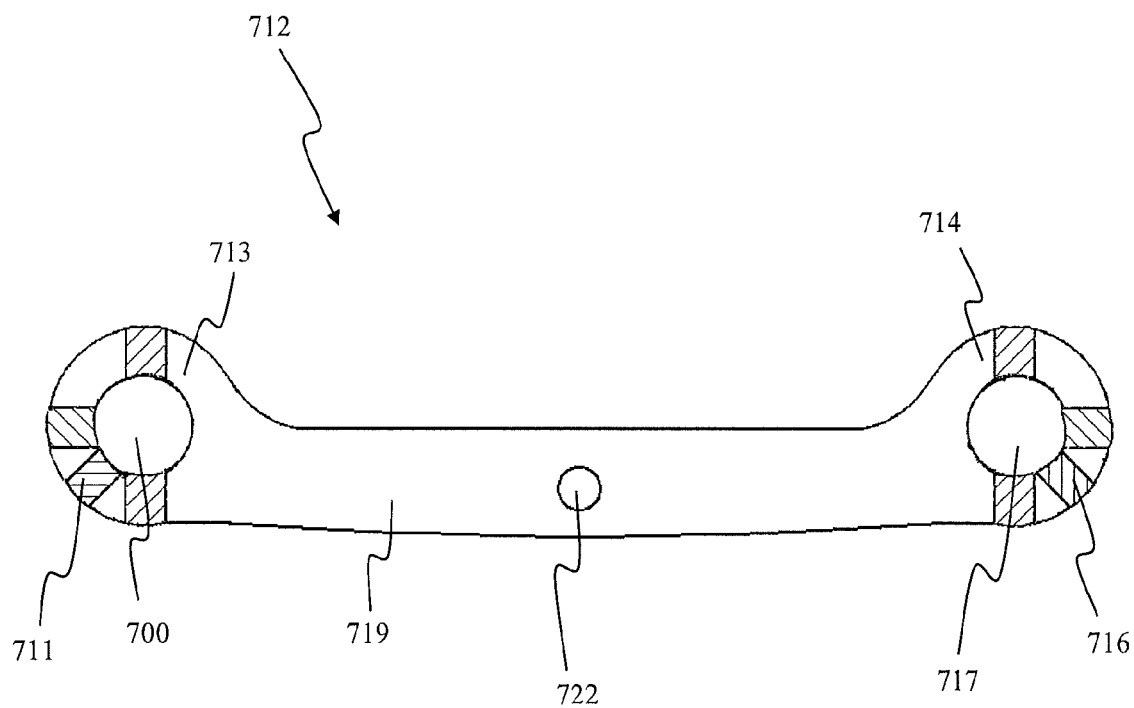
FIG. 15 is a cross section of a plan view of a seventh embodiment of the present invention.

Referring to FIG. 15, a seventh embodiment of the invention is shown. A device 712 comprises an elongate and rigid body 719 connecting a first engagement formation 713 to a second engagement formation 714. The body 719 is cuboidal and thus has a substantially rectangular profile. The first engagement formation 713 and the second engagement formation 714 are disposed away from each other, at opposing and distal ends of the body 719.

In contrast to the sixth embodiment shown in FIG. 13, in the seventh embodiment shown in FIG. 14 the body 719 is a single portion and is shaped so as to correspond to the shape of the underside of a conventional sink 1. The body 719 has a hole 723 in its centre to fit over a rod and is shaped with a slight curve so that the centre of the body 719 bends away from the first engagement formation 713 and the second engagement formation 714. The first aperture 720 and second aperture 717 are thus offset from the longitudinal axis of the body 719.

In addition, both the first engagement formation 713 and the second engagement formation 714 in the seventh embodiment of FIG. 14 comprise a plurality of channels 711, 716 for receiving grub screws 722, 715. A plurality of channels 711, 716 are provided so as to give the user a choice of which channel to insert a grub screw into in case the design of their particular sink provides an obstruction to one of the channels. For example, in the seventh embodiment shown in FIG. 15, channels are provided at 0°, 180°, 225°, 270° and 315° with respect to the longitudinal axis of the body 719 of the device 712.

The above embodiments are described by way of example only. Many variations are possible without departing from the scope of the invention as defined in the appended claims.

The invention claimed is:

1. A device for resisting rotation of a tap that has been fitted to a sink, the device comprising:
   a body comprising an engagement formation adapted for engaging with a part of the tap, the engagement formation comprising an aperture through the body from top to bottom and at least one screw that sits in one or more respective threaded channels extending through the body from a side wall of the body to the aperture to secure the body to the part of the tap, wherein the at least one screw comprises an engagement surface formed at its front end for biting into a part of a tap; and
   at least one distal edge adapted for contacting with a part of the sink remote from the aperture, wherein the at least one distal edge is an abutment edge located to at least one lateral side of the body and between the top and bottom of the body.

2. A device according to claim 1, wherein the at least one distal edge is arranged to abut a downwardly depending part of the sink.

3. A device according to claim 1, further comprising one or more locking elements.

4. A device according to claim 3, wherein each distal edge is provided on a locking element.

5. A device according to claim 4, wherein the length of a locking element is adjustable so as to allow for the distance between a distal edge and the engagement formation is adjustable.

6. A device according to claim 5, wherein each locking element is a bolt, a screw or the like movable relative to the body to adjust the separation of the distal edge from the aperture.

7. A device according to claim 6, wherein each locking element is housed in the body.

8. A device according to claim 7, wherein each screw sits within a screw housing insert provided in the body.

9. A device according to claim 1, wherein the body comprises a slot, which is cut into an edge of the body.

10. A device according to claim 1, further comprising one or more spacers wherein each spacer is arranged to dispose a distal edge away from the engagement formation so that the distal edge is remote from the tap.

11. A device according to claim 10, wherein each spacer comprises a protrusion that projects from a face.

12. A device according to claim 11, wherein the protrusion is arranged to engage with a slot formed in the body so as to allow for the spacer to be slidably mounted to the body.

13. A device according to claim 12, wherein a locking element is housed in the spacer.

* * * * *